United States Patent
Paasch et al.

(10) Patent No.: US 6,345,650 B1
(45) Date of Patent: Feb. 12, 2002

(54) TIRE REPAIR DEVICE AND METHOD

(76) Inventors: Robert W. Paasch, P.O. Box 1405, Aumsville, OR (US) 97325; Keith A. Paasch, P.O. Box 243, Idanha, OR (US) 97350

( * ) Notice: Subject to any disclaimer, the term of this patent is extended or adjusted under 35 U.S.C. 154(b) by 0 days.

(21) Appl. No.: 09/863,216

(22) Filed: May 22, 2001

(51) Int. Cl.[7] .............................. B65B 31/00; B67C 3/00
(52) U.S. Cl. ..................... 141/5; 141/5; 141/9; 141/38; 141/67; 141/100; 406/38
(58) Field of Search ................................. 141/1, 4, 5, 9, 141/38, 67, 100, 102, 105; 406/38; 222/394

(56) References Cited

U.S. PATENT DOCUMENTS 5,472,023 A * 12/1995 Fogal, Sr. et al. .............. 141/9
5,908,145 A * 6/1999 Jaksa .......................... 222/394

* cited by examiner

Primary Examiner—Timothy L. Maust
(74) Attorney, Agent, or Firm—Carl D. Crowell

(57) ABSTRACT

A repair device and method comprising a canister having an internal cavity, an input connecting valve, an output connecting valve, and an output hose for purposes of inflating a pneumatic device such as a flat tire. The utility of this device is as a readily available bridge to connect a deflated tire with any available air source such as an inflated tire. A sealing mixture may be stored in the internal cavity of the canister for injection into a leaking or flat tire to effect repairs by sealing any leaks. When attached between an inflated tire and a flat tire, the sealing mixture is injected into the flat tire by the pressure of the inflated tire and the flat tire may then be inflated.

13 Claims, 1 Drawing Sheet

TIRE REPAIR DEVICE AND METHOD

FIELD OF THE INVENTION

This invention relates to portable and reusable tire inflator products and methods for inflating and sealing tires and other pneumatic systems.

BACKGROUND OF THE INVENTION

Various small portable devices are currently available for use by motorists to internally seal and inflate pneumatic tires that have lost air due to puncture or leak. These devices typically consist of canisters of pressurized propellant gas and tire sealant which are removably connected to an inflation valve of a tire. Such devices are subject to several well-known limitations and disadvantages.

Prior art devices sought to maximize the convenience of their use and storage by minimizing their size. This has resulted in devices which store their contents at extremely high pressure, and which presents a safety hazard. These high-pressure devices are susceptible to high temperatures, and therefore may burst and cause injury when left in extreme environments, such as a car on a hot summer day.

Other prior art devices sought to reduce the risk of injury by lowering the internal pressure and/or increasing the size of the canisters. This results in a less convenient device that is heavier and bulkier and/or one that carries less gas. Lower pressure canisters often are unable to fully inflate a flat tire. Other devices increase the gas content of canisters by removing sealing mixture to allow for more expanding gas. This results in reduced puncture or leak sealing effectiveness.

Another problem with prior art devices is their reliance on hazardous propellant gasses. Historically, ozone-depleting gasses were frequently used due to their high rate of expansion. Modernly, highly flammable propellants, such as methane and butane, are often used. Non-combustible propellant gasses may also be used, but yield lower expansion, and therefore often fail to provide enough gas to inflate a standard tire. Each of these propellant gasses have undesirable properties which make their use disadvantageous.

One prior art device, the Jaksa device (U.S. Pat. No. 5,908,145), teaches of an apparatus similar to the present invention. The Jaksa device, however, has numerous design flaws which limit its usefulness. First, the Jaksa device is simply a "tire sealant dispensing apparatus." Thus, it is designed and useful only for the injection of tire sealant, and does not contemplate inflation of a flat tire. Second, the claimed purpose of the Jaksa device is to inject sealant into a tire to prevent future blowouts and punctures. The device is not intended to be used on a tire which has already experienced a blowout or puncture. The device does not provide or allow for air to inflate a flat tire.

Significantly, the Jaksa device is only usable at angles between horizontal and vertical; but not at angles which are purely horizontal and purely vertical. The present invention differs from the Jaksa device because it is specifically adapted to be used at a purely vertical angle.

Several prior art devices, the Crowley device (U.S. Pat. No. 4,653,550), the Vitack device (U.S. Pat. No. 3,934,622), and the Wells device (U.S. Pat. No. 5,765,601), contemplate storing compressed gas within the devices themselves. Inherent within these devices, is the danger of explosion which accompanies storing contents at high pressure. These devices operate in contrast to the present invention which does not store its contents at high pressure. Rather, the present invention merely operates as a conduit, conducting compressed gas directly from an air source to a deflated device.

One prior art device, the Boetger device (U.S. Pat. No. 4,489,885) similarly operate as a mere conduit between an air source and a deflated device. But the Boetger device differs from the present invention because it does not incorporate a tire sealing mixture. The Boetger device operates merely to inflate a deflated device, and not to inflate and repair it, as does the present invention.

In view of the forgoing it is evident a need exists for a new product and method for effecting repair of tires and providing for inflation of tires and other pneumatic systems.

SUMMARY OF THE INVENTION

The preferred embodiment of the disclosed invention comprises a bottle-shaped canister with a top, a base, and an internal cavity containing a sealing mixture. An inlet port is disposed at the top and an outlet port is disposed at the base. The base is adapted to support the bottle-shaped canister at a purely vertical angle when it is placed upon any surface. An input connecting valve is attached to said inlet port, and an output hose, having a first end and a second end, is attached by its first end to said outlet port. An output connecting valve is disposed at said second end of said output hose.

The invention repairs and inflates a deflated device by injecting the sealing mixture into the deflated device, and filling it with air. The bottle-shaped canister itself is not pressurized, but rather an external air source provides positive pressure to inject the sealing mixture and inflate the device. The external air source is removably attached to the input connecting valve, while the deflated device is removably attached to the output connecting device.

While a large-volume canister of compressed air or an air compressor are desirable air sources, such conveniences are not usually available in a typical roadside repair situation. An alternative solution, is to harvest air from other tires in order to inflate the deflated device. The present invention facilitates this technique. In a preferred embodiment, air sources such as other inflated tires may be used.

A preferred embodiment delivers a volume of sealing mixture sufficient to seal leaks in a standard automobile tire. The sealing mixture may be any sealing material or combinations of sealing materials, including rubber based sealant or acrylic latex materials, such as is commonly used in the relevant art.

The input and output connecting valves may be any type commonly used on relevant art pneumatic devices such as push on type valves, thumb-lock valves, or any other valve assembly including screw on, locking, or needle assemblies adapted for attachment to the valve stems commonly found on automobile tires and other pneumatic devices. The preferred embodiment output connecting valve is a lever-action thumb-lock valve assembly, while the preferred embodiment input connecting valve is a Schrader-type valve. Also, in a preferred embodiment the input connecting valve is removably attached to the canister by means of a threaded sleeve.

The preferred embodiment bottle-shaped canister has an internal cavity large enough to hold an amount of sealing mixture sufficient to seal a standard automobile tire. preferred embodiment canister may be constructed of either lightweight or heavyweight material, such as plastic or other suitable material, and it may be either substantially rigid or flexible. A preferred embodiment canister should be strong enough to withstand the pressure exerted by the external air source. High-pressure systems of 180 psi or greater may be built, however common uses for automobiles allow for lower pressure systems.

The preferred embodiment output hose is flexible, and able to withstand the pressure exerted by the external air source. Any plastic, vinyl multi-layer or rubber type hose with the capacity to hold sufficient pressures, usually greater than 26 psi may be used.

The present invention is reusable, in contrast to prior art devices which are strictly disposable. Although the device may be manufactured cheaply enough to be used in a disposable manner, the present invention contemplates multiple uses. After an initial use, the container may be re-filled with additional sealant mixture for future uses. This provides for minimal waste, thus benefiting the environment.

Numerous benefits are realized by the present invention. One benefit is safe storage. The sealing mixture may be stored at low pressure, and is not susceptible to explosion when heated. Another benefit is reusability. Once the sealing mixture has been expelled from the canister, the invention may be refilled and reused. Another benefit is the wide availability of potential air sources. Any tire from a vehicle, including the spare or even tires from a second vehicle, may be used to provide air to a flat tire.

Other advantages include but are not limited to: The invention may be reused with or without sealing mixture yielding a useful product even after the sealing mixture has been depleted; The invention provides a small and lightweight device for tire repair and re-inflation; The invention provides an environmentally friendly emergency repair device; And an emergency repair device with long term secondary uses.

BRIEF DESCRIPTIONS OF THE DRAWINGS

The drawings relate to multiple aspects of the invention.

DETAILED DESCRIPTION OF THE DRAWINGS

Figure 1:
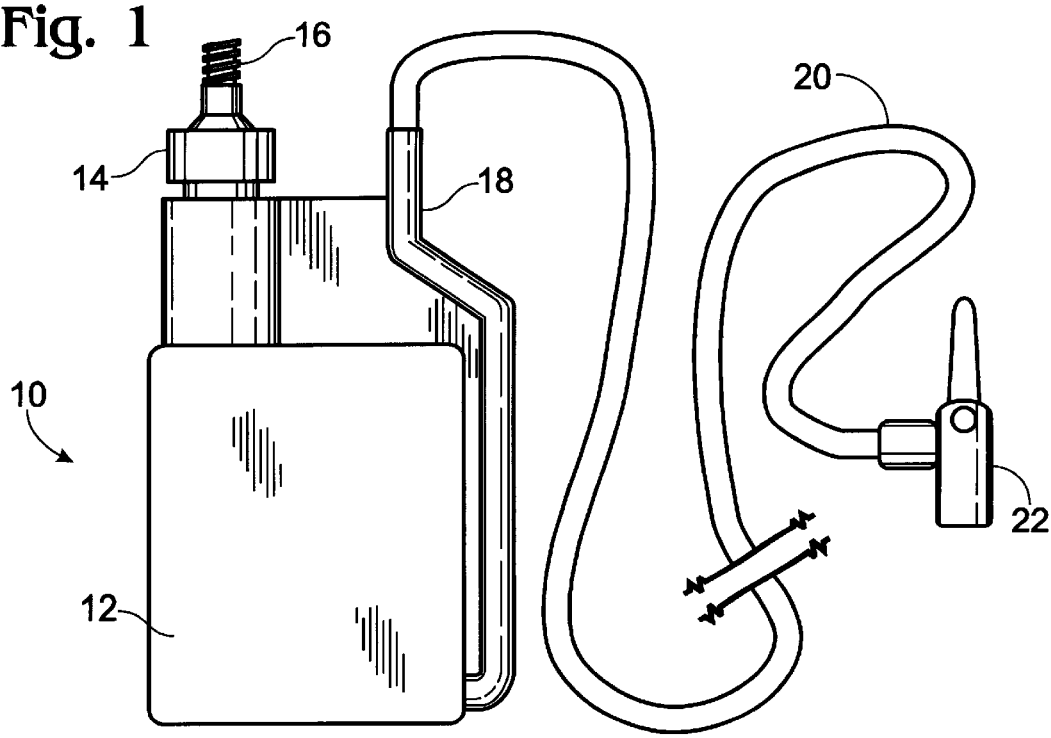
FIG. 1 is frontal view illustrating the design features of the present invention.

FIG. 1 depicts the preferred embodiment of the disclosed invention comprised of a canister 10 having an internal cavity 12, an inlet port 14, and an outlet port 18. An output hose 20 connects the outlet port 18 of the canister 10 to an output connecting valve 22. An input valve 16 is attached to the canister 10 at the inlet port 14.

Figure 2:
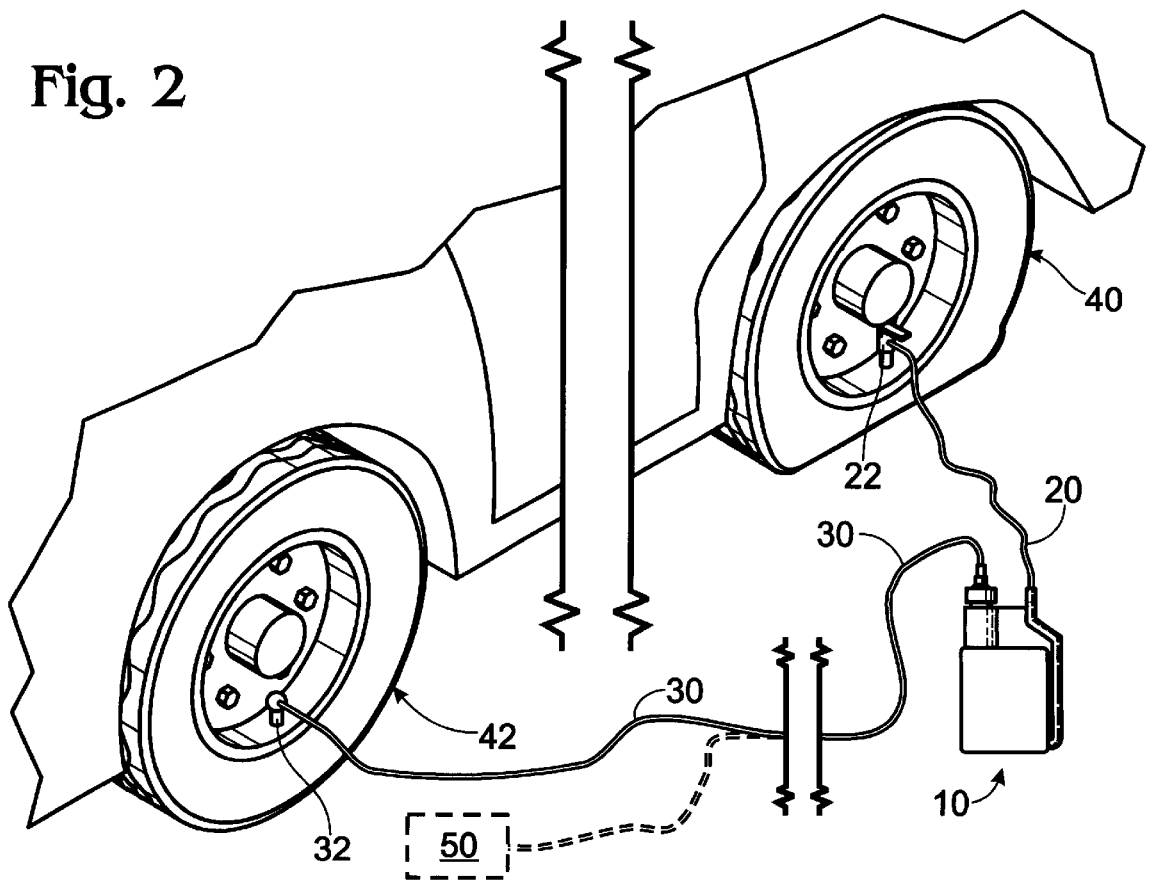
FIG. 2 is a perspective view illustrating the use of the invention as applied between two tires of a vehicle.

FIG. 2 depicts use of the invention between two tires of a vehicle. The invention is applied between a first tire acting as an air source 42 and a second tire needing air 40. The first tire acting as an air source 42 is connected to the canister by means of an input hose 30. The input hose 30 is removably attached to the first tire acting as an air source 30 at the inflation valve 32, and is removably attached to the canister 10 at the input connecting valve 16. An alternative air source 50 may be used in lieu of the first tire acting as an air source 42. The second tire needing air 40 is connected to the canister by means of the output hose 20. The output hose 20 is removably attached to the second tire needing air 40 at the output connecting valve 22, and is removably attached to the canister 10 at the outlet port 18.

We claim:

1. An apparatus for inflating a deflated pneumatic device comprising:
   a bottle-shaped canister having a top, a base, and an internal cavity,
   said base adapted to sit upon a plane and support said bottle-shaped canister at a purely vertical angle and perpendicular to said plane,
   an inlet port disposed at said top, and an outlet port disposed at said base,
   an input connecting valve attached to said bottle-shaped canister at said inlet port,
   an output hose having a first end and a second end,
   said first end of said output hose being attached to said bottle-shaped canister at said outlet port,
   said second end of said output hose end being attached to an output connecting valve,
   and a compressed gas source attached at said input connecting valve,
   said compressed gas source comprising a volume of gas sufficient to inflate said deflated device.

2. The apparatus of claim 1 wherein said internal cavity contains a sealing mixture comprising a sealing material.

3. The apparatus of claim 1 wherein said output connecting valve is attached to a deflated pneumatic device.

4. The apparatus of claim 1 wherein said output hose is removably attached to said canister at said outlet port.

5. The apparatus of claim 1 wherein said output connecting valve is removably attached to a deflated pneumatic device.

6. The apparatus of claim 1 wherein said input connecting valve is removably attached to said canister.

7. The apparatus of claim 1 wherein said compressed gas source is removably attached to said input connecting valve.

8. The apparatus of claim 1 wherein said bottle-shaped canister is constructed of a substantially rigid material.

9. The apparatus of claim 1 wherein said bottle-shaped canister is constructed of a substantially flexible material.

10. The apparatus of claim 1 wherein said output hose is comprised of a substantially flexible material.

11. The apparatus of claim 1 wherein the apparatus is specially adapted to be operative between two or more automotive type tires.

12. A method comprising the steps of:
   Inflating a deflated pneumatic device by connecting said deflated pneumatic device to a compressed gas source by means of a device having
      a bottle-shaped canister having a top, a base, and an internal cavity,
      said base adapted to sit upon a plane and support said bottle-shaped canister at a purely vertical angle and perpendicular to said plane,
      an inlet port disposed at said top, and an outlet port disposed at said base,
      an input connecting valve attached to said bottle-shaped canister at said inlet port,
      an output hose having a first end and a second end,
      said first end of said output hose being attached to said bottle-shaped canister at said outlet port,
      said second end of said output hose end being attached to an output connecting valve,
      and a compressed gas source attached at said input connecting valve,
      said compressed gas source comprising a volume of gas sufficient to inflate said deflated device.

13. The method of claim 12 further comprising the steps of:
   injecting a sealing mixture comprising a sealing material contained in said internal cavity of said bottle-shaped canister into said deflated pneumatic device.

* * * * *